Jan. 11, 1949.    J. C. TIPPETT    2,458,806
RECEPTACLE COVER PRY-OFF TOOL
Filed July 2, 1947
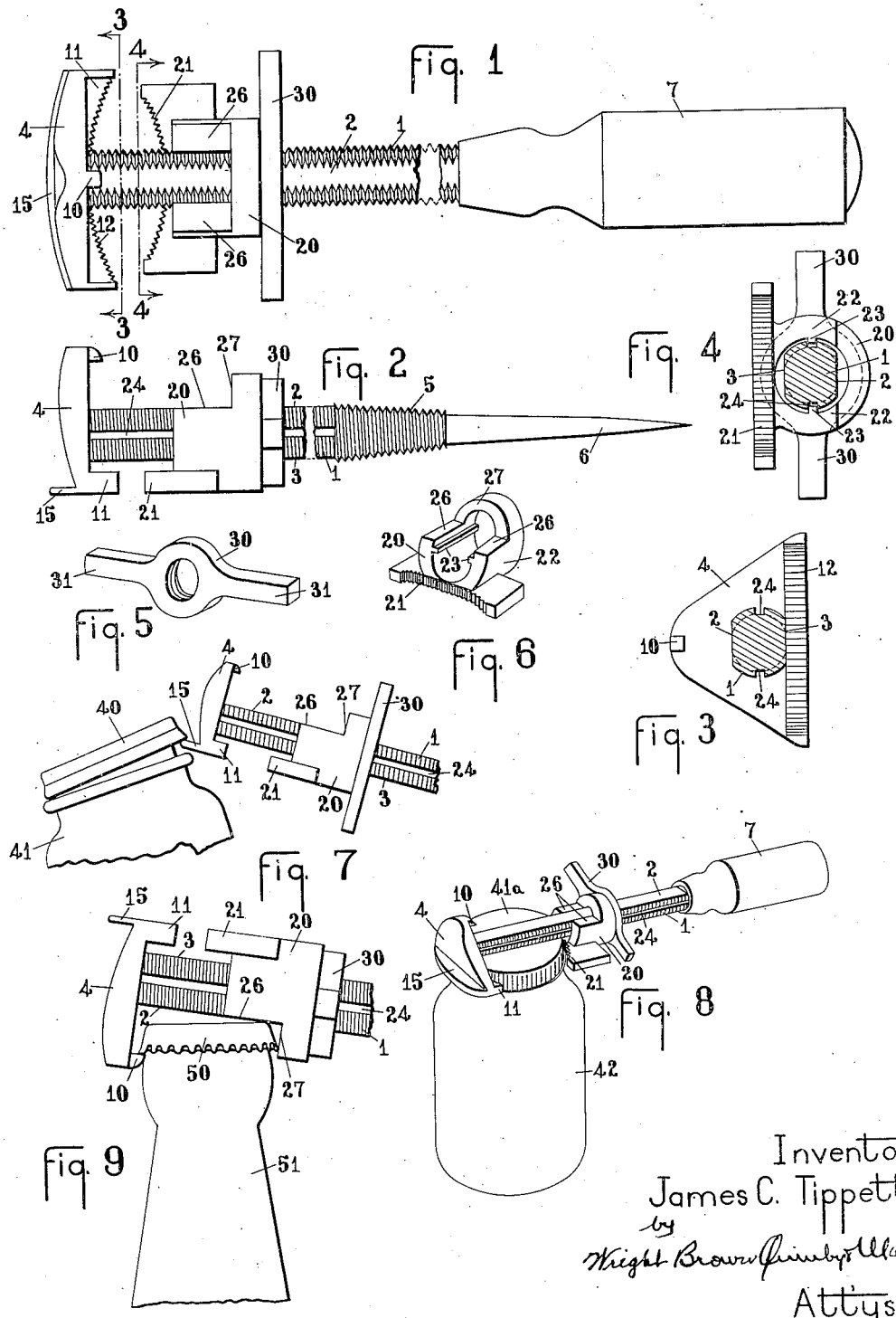
Inventor
James C. Tippett
by
Wright Brown Quinby & Way
Att'ys Patented Jan. 11, 1949

2,458,806

UNITED STATES PATENT OFFICE 2,458,806

RECEPTACLE COVER PRY-OFF TOOL

James C. Tippett, Brockton, Mass.

Application July 2, 1947, Serial No. 758,512

1 Claim. (Cl. 81—3.46)

This invention relates to tools adapted to perform a considerable variety of operations commonly found desirable in the home, and it has for one object to produce such a tool of strong and rugged construction capable of readily performing its desired functions and without injury to articles on which it operates.

A further object is to provide a tool having a stem threaded and splined or grooved, upon one end of which there is secured a head provided with parts useful in prying off friction lids from jars, parts for facilitating the opening of screw cap jars and parts for engagement with edges of bottle caps and the removal of such caps. Co-operating with the head and shank is a jaw slidable on the shank and adjustably limited in its spacing from the head by a nut element threaded on the shank. This jaw element cooperates with the head to engage a screw top of a jar for removal of such top, or to bear on a bottle cap spaced from that part of the head constructed to engage beneath the bottle cap and to act in conjunction with a flat on the shank as a safe fulcrum for prying the cap off without injury to the bottle. The end of the shank opposite to the head may be formed with a point to be used as an ice pick and which is normally covered and concealed by a handle element.

For a complete understanding of this invention, reference may be had to the accompanying drawings in which Figure 1 is a top plan view of the tool.

Figure 2 is a side elevation of the same, the handle being removed to expose the ice pick.

Figures 3 and 4 are sectional views on lines 3—3 and 4—4, respectively, of Figure 1.

Figure 5 and 6 are perspective views of the clamp nut and movable jaw, respectively.

Figure 7 is a fragmentary elevation showing the tool used to remove a friction jar top.

Figure 8 is a perspective view showing the tool employed to remove a screw jar top.

Figure 9 is a view similar to Figure 7, but showing the tool employed to remove a bottle cap.

Referring first to Figures 1 and 2, the tool comprises a shank portion 1 flattened on diametrically opposite faces as at 2 and 3. One end of this shank has fixed thereto a head 4 and the other end is formed with a taper threaded part 5 and a non-threaded point 6. The point 6 may be used as an ice pick and normally it is covered and concealed by a handle 7 having a socket into which the point 6 extends and internally taper threaded to engage with the tapered threaded portion 5. The head 4 is provided at one side opposite to the flat face 2 and a claw 10 which extends backwardly. Its opposite edge is provided with a concaved jaw portion 11 which may have its curved rear face serrated as at 12. It also is provided with an outwardly extending flange 15.

Splined on the shank 1 so as to slide freely therealong is a jaw member 20. This jaw member, as shown best in Figure 6, is provided with a concaved flat jaw portion 21 serrated similar to the portion 11 of the head. It is provided with a cylindrical hub portion 22 having internal splines 23 engaging in the spline grooves 24 of the shank, the portion 22 being of sufficiently larger internal diameter as to slide freely along the shank, but the splines 23 engaging in the spline grooves 24 prevent relative turning of the shank and jaw. The inner portion of the part 22 is cut away on opposite sides to form the flat surfaces 26, which, when the jaw is in place on the shank, are in substantially the same plane with the flat 2 of the shank. Outwardly of the surfaces 26, the portion 22 presents a shoulder 27.

The maximum spacing between the jaw member 20 and the head 4 is determined by a nut 30 shown detached in Figure 5. This nut is threaded on the shank 1 and is preferably provided with diametrically opposed wings 31 which may be engaged by the operator's fingers and by which the nut 30 may be turned readily. Since this nut engages the threads of the shank, rotation of it is necessary in order to cause it to move axially along the shank and this nut is placed back of the jaw 21 to limit its maximum spacing from the head 4, and when firmly engaging it when the parts are tightened up, it acts as a clamp to hold the jaw against sliding motion along the shank.

In Figures 7, 8 and 9, the tool is shown as employed to perform various operations. For example, in Figure 7 the flange 15 of the head is shown as inserted beneath the top 40 and the jar 41 of a friction top jar, this flange permitting by suitable manipulation of the tool, the prying of the top 40 up from the top of the jar so as to detach it therefrom.

In Figure 8 the tool is shown being used to remove the cover 41a of a screw top jar 42. For this purpose, the jaw 21 is adjusted to engage against the outer circular face of the cap 41a opposite to the jaw 11 of the head while the flat face 3 of the shank rests on the cover 41a, the nut 30 being turned to tighten the jaw 21 against the cap. It is then an easy matter by exerting lateral pressure on the handle 7 to grip the cap and unscrew it.

In Figure 9 the tool is shown as used to remove the crown cap 50 of a bottle 51. For this purpose, the claw 10 of the head is placed beneath the lower edge of the cap 50 and the jaw 21 is adjusted so that the shoulder 27 extends downwardly about the cap substantially diametrically opposite to the engagement of the claw 10 therewith, and the nut 30 is brought up so that the cap 50 is held between the head and the jaw. The flat faces 26 of the jaw 21 are then substantially in the same plane with the flat 2 of the shank, presenting therewith a flat surface of substantial area which may bear against the top of the cap 50 spaced well away from the claw 10. This presents an extended flat face bearing on the top of the bottle cap and about which the tool may be fulcrumed, pressing downwardly on its handle end, and lifting the claw 10 with sufficient pressure to detach the cap from the bottle but without danger of breaking the bottle.

From the foregoing description of an embodiment of the invention it will be evident to those skilled in the art that various changes and modifications may be made without departing from its spirit or scope.

I claim:

A receptacle cover pry-off tool comprising a grooved and threaded shank having a head at one end, said head having a rearwardly directed claw engageable beneath the margin of the cap of a capped bottle, a tubular jaw member having inner splines to engage the grooves in said shank, and a lock nut threaded on said shank back of said jaw to determine the maximum spacing of said jaw from said head, said jaw being cut away on the side facing said head to provide a pair of laterally flat surfaces for engagement with the top of said cap spaced back from said claw and a shoulder back of said flat surfaces for engagement with the outer edge of said cap on the side opposite to the one engaged by said claw, said shank having a flat face in substantial alinement with said flat surfaces and therewith presenting a flat area of substantial size to said cap serving as a fulcrum for the lifting of said claw to remove said cap from the bottle when downward pressure is exerted on said shank spaced from said head.

JAMES C. TIPPETT.

REFERENCES CITED

The following references are of record in the file of this patent:

UNITED STATES PATENTS

| Number | Name | Date |
|--------|------|------|
| 760,613 | Clark et al. | May 24, 1904 |
| 1,217,801 | Martin | Feb. 27, 1917 |
| 1,448,833 | Ryder | Mar. 20, 1923 |
| 2,027,785 | Rank | Jan. 14, 1936 |
| 2,304,159 | Florsheim | Dec. 8, 1942 |